Oct. 26, 1965  J. C. MANLEY  3,213,696
INTERMITTENT MOTION DEVICE
Filed July 23, 1962  2 Sheets-Sheet 1

INVENTOR.
JOHN C. MANLEY
BY Clarence R. Petty, Jr.
ATTORNEY

Oct. 26, 1965        J. C. MANLEY        3,213,696

INTERMITTENT MOTION DEVICE

Filed July 23, 1962        2 Sheets-Sheet 2

INVENTOR.
JOHN C. MANLEY
BY
Clarence R. Patty, Jr.
ATTORNEY

United States Patent Office 3,213,696
Patented Oct. 26, 1965

3,213,696
INTERMITTENT MOTION DEVICE
John C. Manley, Bradford, Pa., assignor to Corning Glass Works, Corning, N.Y., a corporation of New York
Filed July 23, 1962, Ser. No. 211,658
5 Claims. (Cl. 74—84)

This invention relates to intermittent motion devices and more particularly to a device for obtaining intermittent rotary motion of one shaft from continuous rotary motion of another shaft.

An intermittent motion device is a mechanism for obtaining a dwell or a series of dwells in the motion of an output shaft from a continuously rotating input shaft. Many designs of intermittent motion devices are known to the art because they are required on a great variety of different types of automatic and semi-automatic machines.

In heretofore devices, intermittent gearing was sometimes used. In many applications, an intermittent motion device known as the Geneva wheel was employed. Intermittent motions have also been obtained in the prior art by the use of cams in connection with differential gear arrangements. In other prior art devices, ratchets have been employed to obtain intermittent motion.

Many of the intermittent motion devices of the prior art are complicated mechanisms, expensive to construct and difficult to maintain. In all of the intermittent gear and Geneva-type motion devices of the prior art, the force from the driving shaft is transmitted to the driven shaft through thrust areas where engagement is usually sudden and therefore acceleration forces are large.

An object of the instant invention is to provide an improved intermittent motion device.

Another object of this invention is to provide an intermittent motion device where the output shaft is accelerated and decelerated substantially uniformly.

Still another object is to provide an intermittent motion device where the output shaft is put in motion substantially shock free.

A further object is to provide an intermittent motion device that is self-locking.

A still further object is to provide an intermittent motion device which can be readily preset for a desired number of dwells per revolution.

Still another object is to provide an intermittent motion device wherein the dwell time of the driven shaft is independent of the motion of the driving shaft.

Another object is to provide an economic intermittent motion device which is readily maintained.

Additional objects, features, and advantages of the present invention will become apparent to those skilled in the art from the following detailed description and the attached drawings, on which by way of example, only the preferred embodiments of the invention are illustrated.

According to the invention an intermittent motion device is formed comprising a driving shaft, driven shaft, suitable means for mounting said driving and driven shafts for rotation, means for providing single revolution motion connected to said driving shaft and having a first output shaft, a pivot arm embodying rotational motion transmitting means which transmitting means are responsive to said first output shaft and which have a second output shaft, said arm being disposed to pivot about the central axis of said first output shaft, a first gear fixedly mounted to said second output shaft by means of an eccentric connecting member, said first gear being disposed so that its pitch circle is substantially perpendicularly intersected by the central axis of said second output shaft, said first gear being revolvable about said central axis of said second output shaft, a second gear fixedly mounted to said driven shaft and disposed in a meshing arrangement with said first gear, and means for maintaining said first and second gears in said meshing arrangement. The ratio of the number of teeth of the first gear to the number of teeth of the second gear is equal to and determines the number of dwells per revolution of the driven shaft.

Figure 1:
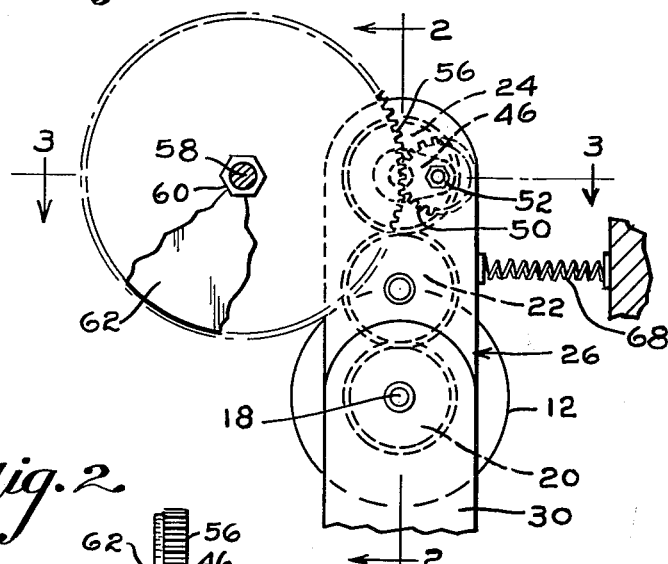
FIG. 1 is a front elevation of the intermittent motion device of this invention.
Figure 2:
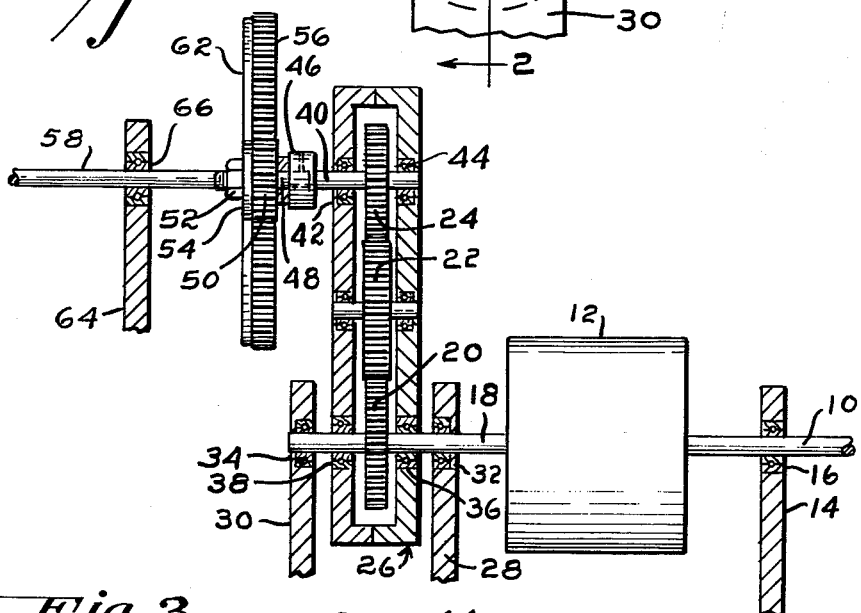
FIG. 2 is a cross sectional elevation of the intermittent motion device of this invention.
Figure 3:
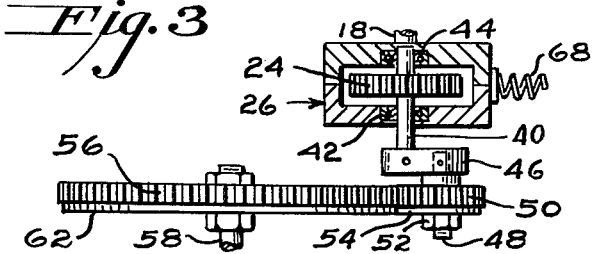
FIG. 3 is a cross sectional view taken along line 3—3 of FIG. 1.

FIGS. 1 and 2 show the intermittent motion device of this invention. Driving shaft 10 is connected to a suitable power and motion source, not shown, such as an electric motor or the like and to suitable single revolution motion means, such as a single revolution clutch 12, or the like. Shaft 10 is supported by support member 14 within which bearing 16 is disposed to allow rotation of said shaft. Single revolution motion means such as a single revolution clutch 12 provide for a single rotation of the output shaft 18 thereof, upon a given electrical, mechanical, pneumatic or the like signal, while the driving shaft 10 is continuously rotated. Such means are well known in the art and suitable means can be readily selected by one familiar with the art. Rotational motion transmitting means, such as a gear train, illustrated by gears 20, 22, and 24, or the like, are responsive to said shaft 18 by direct connection thereto and by fixed coacting relationship of the components thereof by embodiment within pivot arm 26. Shaft 18, together with said gears 20, 22, and 24 and pivot arm 26 is supported by members 28 and 30, within which members, bearings 32 and 34 respectively are disposed to allow rotation of shaft 18 and pivoting of arm 26. Bearings 36 and 38 carry shaft 18 in pivot arm 26. Although the rotational motion transmitting means are illustrated as a gear train, they may also be a chain or belt drive or the like. Such transmitting means are well known in the art. The output from said transmitting means is supplied by shaft 40 which is carried in pivot arm 26 by bearings 42 and 44. Connecting member 46, having protrusion 48, is fixedly mounted to said shaft 40, and gear 50 is fixedly mounted to said protrusion 48 by suitable means, such as nut 52. Disposed adjacent one flat surface of said gear 50 and held in position by nut 52, is gear engagement control plate 54. Gear 50 meshes with and drives gear 56 which is fixedly mounted on driven shaft 58. Disposed adjacent one flat surface of gear 56 and held in position by nut 60 is gear engagement control plate 62. Driven shaft 58 is supported by member 64, within which bearing 66 is disposed to allow rotation of said shaft 58. Gears 50 and 56 are maintained in a meshing arrangement by suitable means such as compression spring 68.

The axis of rotation of said connecting member 46, protrusion 48, and gear 50, is the central axis of shaft 40. For purposes hereinafter described in detail, the distance between the central axis of shaft 40 and the central axis of protrusion 48 is preferably substantially one half of the diameter of the pitch circle of gear 50. Therefore, the central axis of shaft 40, which also is the axis of rotation of member 46 and gear 50, substantially perpendicularly intersects the pitch circle of gear 50.

Upon a predetermined given signal to clutch 12, said clutch causes shaft 18 to rotate one revolution, which rotation is transmitted through gears 20, 22, and 24, which gears have an overall gear ratio of 1:1, causing shaft 40 to rotate one revolution. Since gear 50 is fixedly mounted to shaft 40, through connecting member 46, it will revolve once about the central axis of shaft 40 causing gear 56 and driven shaft 58 to rotate through a distance proportioned to the ratio of the number of teeth in said gears 50 and 56. As gear 50 revolves about the central axis of shaft 40, compression spring 68 imparts a force to arm 26, which arm pivots about the central axis of shaft 18, maintaining gears 50 and 56 in a meshing arrangement. For proper gear performance, gear teeth must engage each other to a depth such that the gear pitch circles are tangent to one another at a point on each circle determined by a straight line between the central axis of such circles, each said point being coincident with the other. Since the compression spring 68 would tend to engage the teeth of each of gears 50 and 56 to a depth greater than that described above for proper gear performance, gear engagement control plate 54, having an outer diameter of the pitch circle of gear 50, is disposed adjacent said gear 50 so that its outer diameter is parallel with the pitch circle of gear 50, and gear engagement control plate 62 having an outer diameter of the pitch circle of gear 56, is disposed adjacent said gear 56 so that its outer diameter is parallel with the pitch circle of gear 56, thereafter gears 50 and 56 are meshed so that the peripheral surface of each said gear engagement control plate rides on the other. Since each said peripheral surface rides on the other, the teeth of each gear can engage those of the other only to the depth described above for proper gear performance.

Gear 50 and connecting member 46 are fixed to shaft 40 and disposed so that when at the dwell position, during the dwell period, the central axis of shaft 40 will perpendicularly intersect the pitch circles of both gears 50 and 56. This arrangement provides self-locking of the driven shaft 58. For example, if a force from any source is applied to the driven shaft tending to rotate the driven shaft, it could do so only if it stripped the teeth off of gears 50 and 56, since gear 56 cannot rotate gear 50 when the described relationship exists. This is so, because gear 56, as any gear, can transmit forces at the pitch circle only and since the pitch circle of gear 56 is coincident with the axis about which gear 50 rotates, the force which gear 56 would tend to transmit would act through said axis thereby having a movement arm of zero. A force applied through an axis cannot cause rotation about said axis. Such a self-locking feature is particularly desirable when an intermittent motion device is employed in an apparatus or machine which rotates components or the like for particular operations to be performed thereon at the various dwell positions, and forces are applied to the components during such operations tending to rotate the driven shaft.

It is readily seen that the number of dwell positions of the device of this invention can be easily preset and changed. The number of dwells of the driven shaft is determined by the gear tooth ratio of gears 50 and 56, when the ratio of input to output of the rotational motion transmitting means is maintained at 1:1. Therefore, the number of dwells may be readily changed by changing either one or both of gears 50 and 56, thereby changing said gear tooth ratio.

It is also readily seen that the dwell time of driven shaft 58 is independent of the motion of driving shaft 10, since the intermittent motion and consequently the dwell time of shaft 58 is determined by the schedule of signals applied to clutch 12 causing it to rotate one revolution. Such signals can be applied to the clutch from means, not shown, in accordance with a predetermined program, at the completion of an operation upon a workpiece being rotated and the like.

Figure 4:
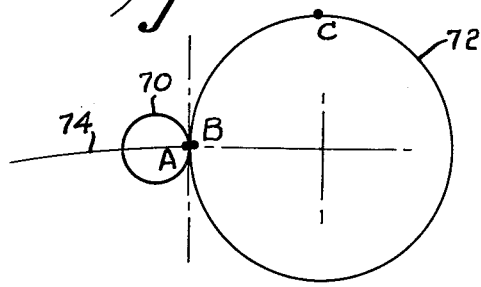
FIGS. 4–8 are diagrammatic illustrations of the pitch circles of the revolving and driven gears of the intermittent motion device of this invention showing the relative positions of said gears at 0°, 90°, 180°, 270° and 360° of rotation of the driving means.

FIGS. 4–8 illustrate the positions of three points A, B, and C on the pitch circles 70 and 72 of gears 50 and 56 respectively, as gear 50 is caused to revolve through 360°. FIG. 4 shows the initial dwell position. Points A and B are coincident. The axis of revolution of circle 70 is perpendicular to circle 70 at point A, therefore, points A and B are coincident with said axis during the dwell period.

Figure 5:
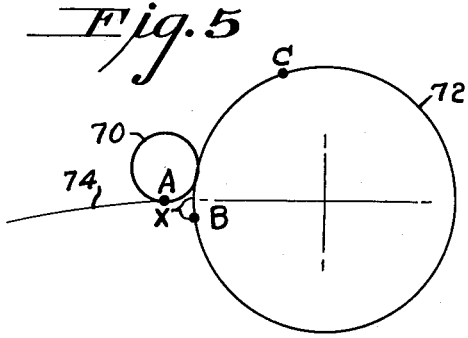

FIG. 5 illustrates the relative positions of points A and B after circle 70 is revolved through about 90°. Since the axis of revolution of circle 70 is perpendicular to said circle at point A, and since said axis of revolution is coincidental with the central axis of shaft 40 in FIGS. 1 and 2, and since shaft 40 is responsive to the movement of arm 26 which arm can merely pivot about the central axis of shaft 18, the axis of revolution of circle 70 will translate along arc 74. As a result of the above relationships, it is seen that although point A revolved through a distance equal to about ¼ of the circumference of circle 70, point B moved through only distance X, providing, a relatively slow and smooth start of the rotation of circle 72.

Figure 6:
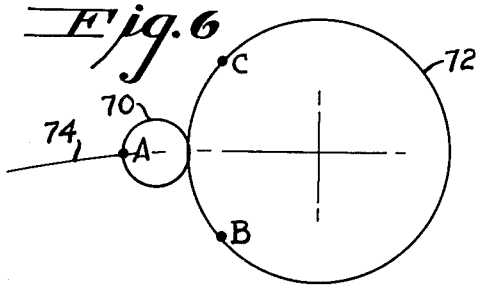

FIG. 6 illustrates the relative positions of points A and B after circle 70 is revolved through about 180°. At this part of the cycle the rotational velocity of circle 72 is highest and point B has moved through a distance equal to about ½ of the circumference of circle 70.

Figure 7:
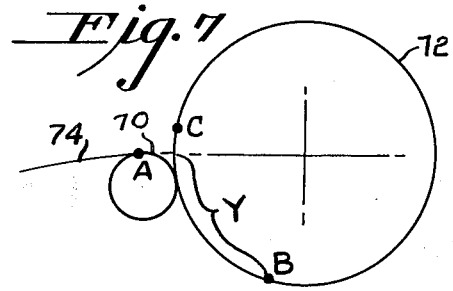

FIG. 7 illustrates points A and B after circle 70 is revolved through about 270°. Point B has moved through a distance Y, which is only a little less than the circumferences of circle A, therefore, as circle 70 completes its revolution, circle 72 will have a comparatively low velocity and thereafter come to a smooth stop.

Figure 8:
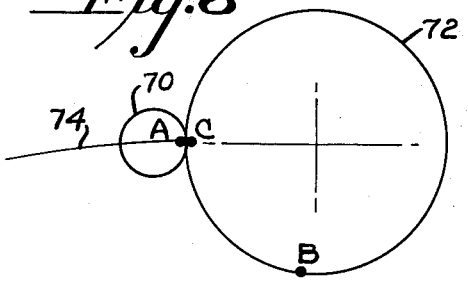

FIG. 8 illustrates the final dwell position after circle 70 has revolved through 360° and point B has advanced a distance equal to the circumference of circle 70. Point C on circle 72 is now coincident with point A and point C will go through the same cycle as described for point B when circle 70 is next caused to revolve.

Figure 9:
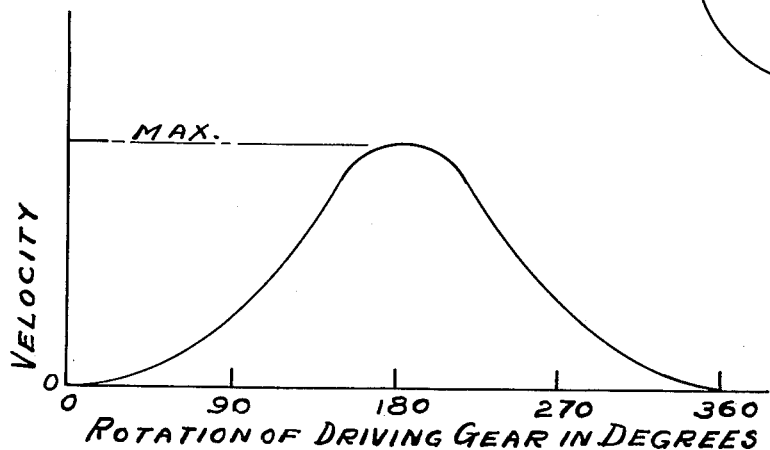
FIG. 9 is a curve of rotational velocity of the driven gear vs. the displacement in degrees of the driving or revolving gear.

FIG. 9 shows a curve of the velocity of a typical point on circle 72, such as point B, as the pitch circle 70 of driving gear 50 is caused to revolve through 360°. It is seen that due to the low velocity at the beginning and end of the cycle, circle 72 and consequently the driven shaft 58, will be put in motion and stopped, substantially shock free.

It is also seen that due to the low velocity and consequent small displacement of circle 72 at the beginning and end of the cycle, any inaccuracy in the stopped position of the single revolution clutch will have an insignificant effect on the positioning of driven shaft 58.

Although the present invention has been described with respect to specific details of certain embodiments thereof, it is not intended that such details be limitations upon the scope of the invention except insofar as set forth in the following claims.

What is claimed is:

1. An intermittent motion device comprising a driving shaft, a driven shaft, means for mounting said driving and driven shafts for rotation, means for providing single revolution motion connected to said driving shaft and having a first output shaft, a pivot arm embodying rotational motion transmitting means, said transmitting means being responsive to said first output shaft and having a second output shaft, said arm being disposed to pivot about the central axis of said first output shaft, a connecting member, a first gear fixedly mounted to said second output shaft by means of said connecting member and disposed with the pitch circle thereof being substantially perpendicularly intersected by the central axis of said second output shaft, said first gear being revolvable about said central axis of said second output shaft, a second gear fixedly mounted to said driven shaft and disposed in a meshing arrangement with said first gear, and means for maintaining said first and second gears in said meshing arrangement.

2. The intermittent motion device of claim 1 wherein said rotational motion transmitting means comprise a gear train.

3. The intermittent motion device of claim 1 wherein said means for providing single revolution motion comprise a single revolution clutch.

4. The intermittent motion device of claim 1 wherein said means for maintaining said first and second gears in said meshing arrangement comprise a first gear engagement control plate having an outer diameter of the pitch circle of said first gear, said first plate being disposed adjacent said first gear with the outer diameter of said first plate being parallel to said pitch circle of said first gear, and a second gear engagement control plate having an outer diameter of the pitch circle of the second gear, said second plate being disposed adjacent said second gear with the outer diameter of said second plate being parallel to said pitch circle of said second gear, the outer peripheral surface of said first plate being disposed for rolling engagement with the outer peripheral surface of said second plate.

5. An intermittent motion device comprising a driving shaft, a driven shaft, means for mounting said driving and driven shafts for rotation, means for providing single revolution motion connected to said driving shaft and having a first output shaft, a pivot arm embodying rotational motion transmitting means, said transmitting means being responsive to said first output shaft and having a second output shaft, an eccentric connecting member, a first gear fixedly mounted to said second output shaft by means of said connecting member, a first gear engagement control plate having an outer diameter of the pitch circle of said first gear, said first plate being disposed adjacent said first gear with the outer diameter thereof parallel to the pitch circle of said first gear, said first gear and said first plate being disposed on said connecting member with the pitch circle of said first gear being substantially perpendicularly intersected by the central axis of said second output shaft, said first gear being revolvable about said central axis of said second output shaft, a second gear fixedly mounted to said driven shaft, a second gear engagement control plate having an outer diameter of the pitch circle of said second gear, said second plate being disposed adjacent said second gear with the outer diameter thereof parallel to the pitch circle of said second gear, said second gear being disposed in a meshing arrangement with said first gear, the outer peripheral surface of said second gear engagement control plate being disposed for rolling engagement with the outer peripheral surface of said first gear engagement control plate, and spring means for maintaining said first and second gears in said meshing arrangement.

References Cited by the Examiner
UNITED STATES PATENTS

| | | | |
|---|---|---|---|
| 1,393,219 | 10/21 | Hohl | 74—394 |
| 1,412,889 | 4/22 | O'Brien | 74—462 |
| 2,788,534 | 4/57 | Liska | 74—393 |
| 2,788,672 | 4/57 | Liska | 74—393 |
| 2,788,673 | 4/57 | Liska | 74—393 |

BROUGHTON G. DURHAM, *Primary Examiner.*